United States Patent
Yamanaka

[19]

[11] Patent Number: 6,119,747

[45] Date of Patent: Sep. 19, 2000

[54] 2+9 STEEL CORDS FOR THE REINFORCEMENT OF RUBBER ARTICLES AND PNEUMATIC RADIAL TIRES USING THE SAME

[75] Inventor: Takaya Yamanaka, Kodaira, Japan

[73] Assignee: Bridgestone Corporation, Tokyo, Japan

[21] Appl. No.: 09/121,669

[22] Filed: Jul. 23, 1998

[30] Foreign Application Priority Data

Jul. 23, 1997 [JP] Japan ..................................... 9-197331

[51] Int. Cl.[7] ................................. B60C 9/00; B60C 9/08; B60C 9/20; D07B 1/06; D07B 1/08; D07B 1/10
[52] U.S. Cl. .............................. 152/527; 57/212; 57/902; 152/451; 152/556
[58] Field of Search ...................... 57/212, 902; 152/451, 152/527, 556

[56] References Cited

U.S. PATENT DOCUMENTS 5,706,641   1/1998   Ishizaka .................. 57/902 X

FOREIGN PATENT DOCUMENTS

| 372959 | 6/1990 | European Pat. Off. . |
| 790349 | 8/1997 | European Pat. Off. . |
| 64-30398 U | 2/1989 | Japan . |

*Primary Examiner*—Adrienne C. Johnstone
*Attorney, Agent, or Firm*—Sughrue, Mion, Zinn, Macpeak & Seas, PLLC

[57] ABSTRACT

A steel cord for the reinforcement of rubber articles has a two-layer construction in which a core consists of two steel filaments and a sheath arranged around the core consists of nine steel filaments. Preferably the two steel filaments constituting the core are either non-twisted filaments or are twisted at a pitch of not less than 30 mm on average, a ratio (ds/dc) of the diameter ds of each steel filament constituting the sheath to the diameter dc of each steel filament constituting the core is within a range of 35–80%, and a ratio (a/b) of the minor diameter a to the major diameter b of the cord cross-section in an arbitrary position in the longitudinal direction of the cord is within a range of 63–100%

6 Claims, 1 Drawing Sheet

FIG_1
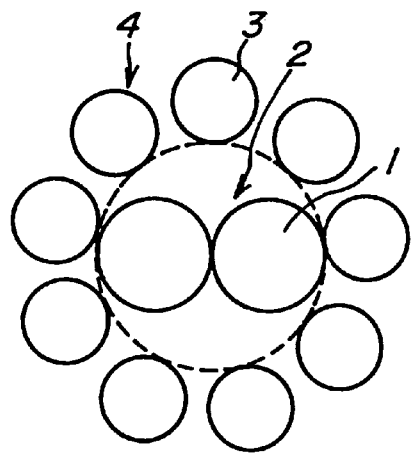
FIG_2
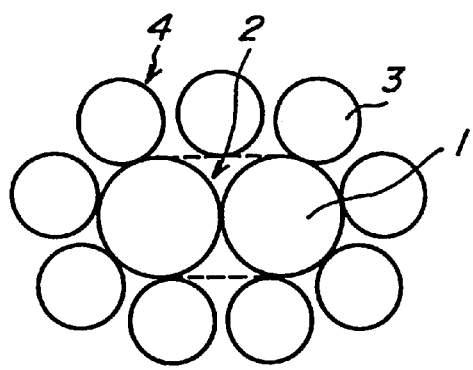
FIG_3  PRIOR ART
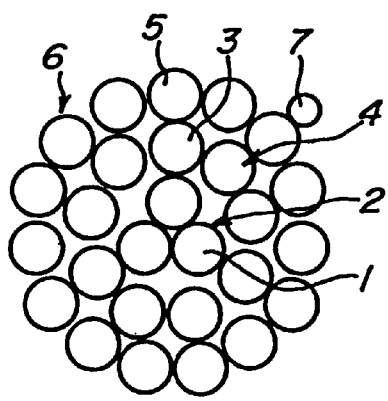

2+9 STEEL CORDS FOR THE REINFORCEMENT OF RUBBER ARTICLES AND PNEUMATIC RADIAL TIRES USING THE SAME

BACKGROUND OF THE INVENTION

1. Field of the Invention

This invention relates to a steel cord for the reinforcement of rubber articles such as rubber hose, conveyor belt, pneumatic tire and the like, and more particularly to a steel cord for the reinforcement of rubber articles having a two-layer construction made of a core consisting of two steel filaments and a sheath consisting of nine steel filaments arranged around the core as well as a pneumatic radial tire using the same in a radial carcass and/or a belt.

2. Description of Related Art

Steel cords have widely been used as a reinforcement for rubber articles such as rubber hose, conveyor belt, pneumatic tire and the like. For example, there is known a steel cord having a 3+9+15 construction formed by twisting steel filaments having the same filament diameter so as to change a twisting pitch every layer as a typical steel cord for reinforcing a heavy duty pneumatic tire. Such a steel cord is comprised of a core consisting of three steel filaments, an inner layer sheath arranged around the core and consisting of nine steel filaments, and an outer layer sheath arranged around the inner layer sheath and consisting of fifteen steel filaments.

In the steel cord having the above 3+9+15 construction, there is no gap of penetrating rubber into space portion inside the cord, so that if water contacts with the cord, it penetrates into the space portion of the cord not filled with rubber to corrode the inside of the cord and finally water propagates along the space portion in the longitudinal direction of the cord to undesirably enlarge the cord corrosion.

For this end, JP-U-64-30398 proposes a steel cord having two-layer or three-layer construction formed by arranging plural steel filaments in parallel to each other to form a core and twisting steel filaments at the outside of the core so as to create gaps between the steel filaments of the sheath layer. In this steel cord, rubber is easy to penetrate into the central portion of the cord through these gaps, so that the corrosion hardly occurs.

In the example described in JP-U-64-30398, however, the core is formed by arranging three or more steel filaments in parallel to each other, so that a space not penetrating rubber is formed in a center of the core. For instance, when such a steel cord is used in a belt of the tire, if a tread of the tire is subjected to cut damage in the running on bad road, water penetrates into a space portion not penetrating rubber inside the cord to cause corrosion in the inside of the cord. Further water propagates along the space portion in the longitudinal direction of the cord to enlarge the cord corrosion to finally cause separation failure.

SUMMARY OF THE INVENTION

It is, therefore, an object of the invention to solve the aforementioned problems of the conventional technique and to provide a steel cord having an excellent resistance to corrosion propagation as well as a pneumatic tire having an excellent durability and hardly causing separation failure even if the tire is subjected to cut damage.

According to the invention, there is the provision of a steel cord for the reinforcement of rubber article having a two-layer construction, which comprises a core consisting of two steel filaments and a sheath arranged around the core and consisting of nine steel filaments.

In a preferable embodiment of the invention, a twisting pitch of the two steel filaments constituting the core is not less than 30 mm on average, and a ratio (ds/dc) of diameter ds of the steel filament constituting the sheath to diameter dc of the steel filament constituting the core is within a range of 35–80%, and a ratio (a/b) of minor size a to major size b at a section of the cord in an arbitrary position in the longitudinal direction of the cord is within a range of 63–100%.

In another preferable embodiment of the invention, the diameter dc of the steel filament constituting the core is 0.10–0.40 mm, and the diameter ds of the steel filament constituting the sheath is 0.10–0.37 mm.

In the other preferable embodiment of the invention, the steel filament constituting the core is a non-twisted filament.

According to the invention, there is the provision of a pneumatic radial tire comprising a pair of bead portions each containing a bead core embedded therein, a pair of side portions, a tread portion, a radial carcass extending between the bead portions and wound around each of the bead cores to form a turnup portion, and a belt superimposed about a crown portion of the radial carcass, in which the radial carcass and/or the belt are made from a rubberized layer of steel cords having a two-layer construction, each of the steel cords comprising a core consisting of two steel filaments and a sheath arranged around the core and consisting of nine steel filaments.

In a preferable embodiment of the invention, a twisting pitch of the two filaments constituting the core is not less than 30 mm on average, and a ratio (ds/dc) of the diameter ds of each steel filament constituting the sheath to the diameter dc of each steel filament constituting the core is within a range of 35–80%, and a ratio (a/b) of the minor diameter a to the major diameter b of the cord cross-section in an arbitrary position in the longitudinal direction of the cord is within a range of 63–100%.

In another preferable embodiment of the invention, the diameter dc of each steel filament constituting the core is 0.10–0.40 mm, and the diameter ds of each steel filament constituting the sheath is 0.10–0.37 mm.

In the other preferable embodiment of the invention, each steel filament constituting the core is a non-twisted filament.

BRIEF DESCRIPTION OF THE DRAWINGS

The invention will be described with reference to the accompanying drawings, wherein:

FIG. 1 is a schematically section view of an embodiment of the steel cord according to the invention;

FIG. 2 is a schematically section view of another embodiment of the steel cord according to the invention; and FIG. 3 is a schematically section view of the conventional steel cord.

DESCRIPTION OF PREFERRED EMBODIMENTS

The steel cord according to the invention has the construction as mentioned above or is a steel cord for the reinforcement of rubber article having the two-layer construction formed by using two steel filaments as a core and nine steel filaments as a sheath. In such a steel cord, rubber sufficiently penetrates into an inside of the cord, so that the resistance to corrosion propagation is excellent. Also, when these steel cords are used in a radial carcass and/or a belt of a pneumatic radial tire, if the cut damage is caused, separation failure is hardly caused to improve the durability of the tire.

On the other hand, if the cord of the steel cord is comprised of a single steel filament, the steel filaments constituting the sheath are partially arranged around the core, so that even if rubber penetrates into the core, a non-penetrated portion of rubber is helically formed in the cord along the longitudinal direction thereof. As a result, when the cord is subjected to cut damage, water penetrates into the non-penetrated portion of rubber in the cord to corrode the cord and further propagates along the non-penetrated portion in the longitudinal direction of the cord to enlarge the cord corrosion, so that such a steel cord is poor in the resistance to corrosion propagation.

Moreover, when the core of the steel cord is comprised of three or more steel filaments, the resistance to corrosion propagation is degraded by the propagation of water along the space portion not penetrating rubber in the inside of the cord as previously mentioned.

In the steel cord according to the invention, it is favorable that the twisting pitch of the two steel filaments constituting the core is not less than 30 mm on average, more preferably 50 mm. When the twisting pitch is less than 30 mm, it is difficult to penetrate rubber between the two steel filaments constituting the core and the productivity of the cord lowers.

In the steel cord according to the invention, it is favorable that the ratio ds/dc of diameter ds of steel filament constituting the sheath to diameter dc of steel filament constituting the core is within a range of 35–80%. When the ratio ds/dc is within the above range, a gap enough to sufficiently penetrate rubber into the inside of the cord is ensured between the adjoining steel filaments constituting the sheath and also a sufficient gap between the adjoining steel filaments in the sheath is ensured even when a steel filament constituting the sheath is fallen down in a gap between the two steel filaments constituting the core.

In the steel cord according to the invention, it is favorable that the ratio a/b of minor size a to major size b at the section of the cord in an arbitrary position of the longitudinal direction of the cord within a range of 63–100%. When the ratio a/b is less than 63%, if the belt of the pneumatic radial tire is formed by using a rubberized layer containing such steel cords at the same end count, the distance between adjoining cords becomes small and hence separation failure at the belt end is liable to be caused and also the twisting property of the cord is hardly maintained.

In the steel cord according to the invention, it is favorable that the diameter dc of the steel filament constituting the core is 0.10–0.40 mm and the diameter ds of the steel filament constituting the sheath is 0.10–0.37 mm. When each of the diameters dc and ds is less than the lower limit, it is very difficult to manufacture the steel filament. When it exceeds the upper limit, if the steel cord is covered with a coating rubber to form a middle member for the tire, the steel filament is plastically deformed to cause the warping of the middle member to thereby lower the productivity.

In the steel cord according to the invention, it is further favorable that the steel filament constituting the core is a non-twisted filament. In this case, the rubber penetrability is improved and also the productivity is improved. Moreover, either or both of the two steel filaments constituting the core may be subjected to a forming of wave or helix or both.

The following examples are given in illustration of the invention and are not intended as limitations thereof.

EXAMPLE 1

The steel cord of this example has a section shown in FIG. 1 and is a steel cord having a two-layer construction of 2+9 formed by using two steel filaments 1 as a core 2 and nine steel filaments 3 as a sheath 4.

The twisting pitch of the two steel filaments 1 constituting the core 2 is 9 mm on average.

The diameter dc of the steel filament 1 constituting the core 2 is 0.37 mm, and the diameter ds of the steel filament 3 constituting the sheath 4 is 0.275 mm.

The ratio ds/dc of diameter ds of the steel filament 3 constituting the sheath 4 to diameter dc of the steel filament 1 constituting the core 2 is 74.3%.

Also, the ratio a/b of minor size a to major size b in the section of the cord at an arbitrary position in the longitudinal direction of the cord is 100%.

EXAMPLE 2

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 50 mm on average.

The diameter dc of the steel filament 1 constituting the core 2 is 0.37 mm, and the diameter ds of the steel filament 3 constituting the sheath 4 is 0.37 mm.

The ratio ds/dc of diameter ds of the steel filament 3 constituting the sheath 4 to diameter dc of the steel filament 1 constituting the core 2 is 100%.

Also, the ratio a/b of minor size a to major size b in the section of the cord at an arbitrary position in the longitudinal direction of the cord is 75–100%.

EXAMPLE 3

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 50 mm on average.

The diameter dc of the steel filament 1 constituting the core 2 is 0.40 mm, and the diameter ds of the steel filament 3 constituting the sheath 4 is 0.12 mm.

The ratio ds/dc of diameter ds of the steel filament 3 constituting the sheath 4 to diameter dc of the steel filament 1 constituting the core 2 is 30%.

Also, the ratio a/b of minor size a to major size b in the section of the cord at an arbitrary position in the longitudinal direction of the cord is 61.5–100%.

EXAMPL 4

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 50 mm on average.

The diameter dc of the steel filament 1 constituting the core 2 is 0.44 mm, and the diameter ds of the steel filament 3 constituting the sheath 4 is 0.40 mm.

The ratio ds/dc of diameter ds of the steel filament 3 constituting the sheath 4 to diameter dc of the steel filament 1 constituting the core 2 is 90.9%.

Also, the ratio a/b of minor size a to major size b in the section of the cord at an arbitrary position in the longitudinal direction of the cord is 73.8–100%.

EXAMPLE 5

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 50 mm on average.

The diameter dc of the steel filament 1 constituting the core 2 is 0.37 mm, and the diameter ds of the steel filament 3 constituting the sheath 4 is 0.275 mm.

The ratio ds/dc of diameter ds of the steel filament 3 constituting the sheath 4 to diameter dc of the steel filament 1 constituting the core 2 is 74.3%.

Also, the ratio a/b of minor size a to major size b in the section of the cord at an arbitrary position in the longitudinal direction of the cord is 71.3–100%.

EXAMPLE 6

The steel cord of this example is a steel cord having a two-layer construction of 2+9+1 formed by using two steel filaments 1 as a core 2, nine steel filaments 3 as a sheath 4 and one wrapping filament arranged around the sheath 4.

The twisting pitch of the two steel filaments 1 constituting the core 2 is 50 mm on average.

The diameter dc of the steel filament 1 constituting the core 2 is 0.37 mm, and the diameter ds of the steel filament 3 constituting the sheath 4 is 0.20 mm.

The ratio ds/dc of diameter ds of the steel filament 3 constituting the sheath 4 to diameter dc of the steel filament 1 constituting the core 2 is 54.1%.

Also, the ratio a/b of minor size a to major size b in the section of the cord at an arbitrary position in the longitudinal direction of the cord is 67.5–100%.

EXAMPLE 7

The steel cord of this example has a section shown in FIG. 2 and is a steel cord having a two-layer construction of 2+9 formed by using two steel filaments 1 as a core 2 and nine steel filaments 3 as a sheath 4.

The twisting pitch of the two steel filaments 1 constituting the core 2 is infinite.

The diameter dc of the steel filament 1 constituting the core 2 is 0.40 mm, and the diameter ds of the steel filament 3 constituting the sheath 4 is 0.305 mm.

The ratio ds/dc of diameter ds of the steel filament 3 constituting the sheath 4 to diameter dc of the steel filament 1 constituting the core 2 is 76.3%.

Also, the ratio a/b of minor size a to major size b in the section of the cord at an arbitrary position in the longitudinal direction of the cord is 71.6%.

EXAMPLE 8

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 50 mm on average.

The diameter dc of the steel filament 1 constituting the core 2 is 0.20 mm, and the diameter ds of the steel filament 3 constituting the sheath 4 is 0.15 mm.

The ratio ds/dc of diameter ds of the steel filament 3 constituting the sheath 4 to diameter dc of the steel filament 1 constituting the core 2 is 75%.

Also, the ratio a/b of minor size a to major size b in the section of the cord at an arbitrary position in the longitudinal direction of the cord is 71.4–100%.

EXAMPLE 9

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is infinite.

The diameter dc of the steel filament 1 constituting the core 2 is 0.38 mm, and the diameter ds of the steel filament 3 constituting the sheath 4 is 0.285 mm.

The ratio ds/dc of diameter ds of the steel filament 3 constituting the sheath 4 to diameter dc of the steel filament 1 constituting the core 2 is 75%.

Also, the ratio a/b of minor size a to major size b in the section of the cord at an arbitrary position in the longitudinal direction of the cord is 71.4%.

EXAMPLE 10

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 25 mm.

The diameter dc of the steel filament 1 constituting the core 2 is 0.40 mm, and the diameter ds of the steel filament 3 constituting the sheath 4 is 0.305 mm.

The ratio ds/dc of diameter ds of the steel filament 3 constituting the sheath 4 to diameter dc of the steel filament 1 constituting the core 2 is 76.3%.

Also, the ratio a/b of minor size a to major size b in the section of the cord at an arbitrary position in the longitudinal direction of the cord is 71.6–100%.

EXAMPLE 11

The steel cord of this example is a steel cord having a two-layer construction of 2+9 formed by using two steel filaments 1 as a core 2 and nine steel filaments 3 as a sheath 4.

The twisting pitch of the two steel filaments 1 constituting the core 2 is 35 mm.

The diameter dc of the steel filament 1 constituting the core 2 is 0.40 mm, and the diameter ds of the steel filament 3 constituting the sheath 4 is 0.305 mm.

The ratio ds/dc of diameter ds of the steel filament 3 constituting the sheath 4 to diameter dc of the steel filament 1 constituting the core 2 is 76.3%.

Also, the ratio a/b of minor size a to major size b in the section of the cord at an arbitrary position in the longitudinal direction of the cord is 71.6–100%.

CONVENTIONAL EXAMPLE

The steel cord of this example has a section shown in FIG. 3 and is a steel cord having a three-layer construction of 3+9+15+1 formed by using three steel filaments 1 as a core 2, nine steel filaments 3 as an inner sheath 4, fifteen steel filaments 5 as an outer sheath 6 and one wrapping filament 7 arranged around the outer sheath 6.

The twisting pitch of the three steel filaments 1 constituting the core 2 is 6 mm, and the twisting pitch of the nine steel filaments 3 constituting the inner sheath 4 is 12 mm, and the twisting pitch of the fifteen steel filaments 5 constituting the outer sheath 6 is 18 mm.

The diameter dc of the steel filament 1 constituting the core 2 is 0.23 mm, and the diameter ds of the steel filament 3 constituting the inner sheath 4 is 0.23 mm, and the diameter of the steel filament 5 constituting the outer sheath 6 is 0.23 mm.

The ratio ds/dc of diameter ds of the steel filament 3 constituting the inner sheath 4 to diameter dc of the steel filament 1 constituting the core 2 is 100%.

Also, the ratio a/b of minor size a to major size b in the section of the cord at an arbitrary position in the longitudinal direction of the cord is 100%.

COMPARATIVE EXAMPLE 1

The steel cord of this example is a steel cord having a two-layer construction of 1+9 formed by using one steel filament 1 as a core 2 and nine steel filaments 3 as a sheath 4.

The one steel filament 1 constituting the core 2 is a non-twisted filament and the twisting pitch thereof is infinite.

The diameter dc of the steel filament 1 constituting the core 2 is 0.30 mm, and the diameter ds of the steel filament 3 constituting the sheath 4 is 0.15 mm.

The ratio ds/dc of diameter ds of the steel filament 3 constituting the sheath 4 to diameter dc of the steel filament 1 constituting the core 2 is 50%.

Also, the ratio a/b of minor size a to major size b in the section of the cord at an arbitrary position in the longitudinal direction of the cord is 100%.

COMPARATIVE EXAMPLE 2

The steel cord of this example is a steel cord having a two-layer construction of 3+9 formed by using three steel filaments 1 as a core 2 and nine steel filaments 3 as a sheath 4.

The twisting pitch of the three steel filaments 1 constituting the core 2 is 7 mm.

The diameter dc of the steel filament 1 constituting the core 2 is 0.30 mm, and the diameter ds of the steel filament 3 constituting the sheath 4 is 0.30 mm.

The ratio ds/dc of diameter ds of the steel filament 3 constituting the sheath 4 to diameter dc of the steel filament 1 constituting the core 2 is 100%.

Also, the ratio a/b of minor size a to major size b in the section of the cord at an arbitrary position in the longitudinal direction of the cord is 100%.

Each of the steel cords in Examples 1–9, Conventional Example and Comparative Examples 1–2 is used to form a belt comprised of four rubberized layers in a pneumatic radial tire for truck having a tire size of 10.00R20. Then, the rubber penetration into the inside of the cord, separation resistance and warping quantity of rubber sheet are measured with respect to these tires.

As to the rubber penetration into the inside of the cord, a steel cord is taken out from the belt of the tire and then quantity of rubber adhered onto the surface of the core 2 and quantity of rubber adhered onto the surface of the sheath 4 are measured, respectively. The measured results are shown in Tables 1–3 as 100% when rubber is adhered to all surfaces of the core 2 and sheath 4 and 0% when rubber is not adhered to the core and sheath.

The separation resistance is evaluated by examining the presence or absence of a large separation of not less than 5 $cm^2$ created by the corrosion of the steel cord through water propagation along the inside of the steel cord when the tire is cut after the tire is mounted onto a tuck of 10 tons and run on unpaved bad road until complete wearing of the tread. The measured results are shown in Tables 1–3 as no separation (represented by ⊚), somewhat occurrence of separation (represented by ○) and serious occurrence of separation (represented by ×).

The warping quantity of the rubber sheet is measured with respect to the rubberized cord layers of the steel cords in Examples 1–9, Conventional Example and Comparative examples 1–2, respectively. It is known that the productivity in the production step of the tire is poor when the warping quantity exceeds 10 mm. The measured results are also shown in Tables 1–3.

TABLE 1

|  | Example 1 | Example 2 | Example 3 | Example 4 | Example 5 |
| --- | --- | --- | --- | --- | --- |
| Cord construction | 2 + 9 | 2 + 9 | 2 + 9 | 2 + 9 | 2 + 9 |
| Filament diameter dc | 0.37 mm | 0.37 mm | 0.40 mm | 0.44 mm | 0.37 mm |
| Filament diameter ds | 0.275 mm | 0.37 mm | 0.12 mm | 0.40 mm | 0.275 mm |
| Ratio ds/dc | 74.3% | 100% | 30.0% | 90.9% | 74.3% |
| Twisting pitch in core | 9 mm | 50 mm | 50 mm | 50 mm | 50 mm |
| Twisting pitch in sheath | 18 mm | 18 mm | 18 mm | 18 mm | 18 mm |
| Minor size a/major size b | 100% | 75.0–100% | 61.5–100% | 73.8–100% | 71.3–100% |
| Rubber penetration |  |  |  |  |  |
| on core | 51% | 66% | 90% | 91% | 96% |
| on sheath | 98% | 99% | 99% | 99% | 99% |
| Separation resistance | ○ | ○ | ○ | ⊚ | ⊚ |
| Warping quantity of sheet | 2 mm | 1 mm | 3 mm | 7 mm | 2 mm |

TABLE 2

|  | Example 6 | Example 7 | Example 8 | Example 9 | Example 10 | Example 11 |
|---|---|---|---|---|---|---|
| Cord construction | 2 + 9 + 1 | 2 + 9 | 2 + 9 | 2 + 9 | 2 + 9 | 2 + 9 |
| Filament diameter dc | 0.37 mm | 0.40 mm | 0.20 mm | 0.38 mm | 0.40 mm | 0.40 mm |
| Filament diameter ds | 0.20 mm | 0.305 mm | 0.15 mm | 0.285 mm | 0.305 mm | 0.305 mm |
| Ratio ds/dc | 54.1% | 76.3% | 75.0% | 75.0% | 76.3% | 76.3% |
| Twisting pitch in core | 50 mm | ∞ | 50 mm | ∞ | 25 mm | 35 mm |
| Twisting pitch in sheath | 18 mm | 18 mm | 16 mm | 18 mm | 18 mm | 18 mm |
| Minor size a/major size b | 67.5–100% | 71.6% | 71.4–100% | 71.4% | 71.6–100% | 71.6–100% |
| Rubber penetration | | | | | | |
| on core | 97% | 98% | 95% | 98% | 62% | 83% |
| on sheath | 99% | 98% | 99% | 99% | 98% | 99% |
| Separation resistance | ⊚ | ⊚ | ⊚ | ⊚ | ⊚ | ⊚ |
| Warping quantity of sheet | 2 mm | 2 mm | 1 mm | 1 mm | 2 mm | 2 mm |

TABLE 3

|  | Conventional Example | Comparative Example 1 | Comparative Example 2 |
|---|---|---|---|
| Cord construction | 3 + 9 + 1.5 + 1 | 1 + 9 | 3 + 9 |
| Filament diameter in core dc | 0.23 mm | 0.30 mm | 0.30 mm |
| Filament diameter in inner sheath ds | 0.23 mm | 0.15 mm | 0.30 mm |
| Filament diameter in outer sheath | 0.23 mm | — | — |
| Ratio ds/dc | 100% | 50% | 100% |
| Twisting pitch in core | 6 mm | ∞ | 7 mm |
| Twisting pitch in inner sheath | 12 mm | 12 mm | 15 mm |
| Twisting pitch in outer sheath | 18 mm | — | — |
| Minor size a/major size b | 100% | 100% | 100% |
| Rubber penetration | | | |
| on core | 0% | 15% | 10% |
| on sheath | 4% | 98% | 98% |
| Separation resistance | Δ | Δ | Δ |
| Warping quantity of sheet | 1 mm | 2 mm | 1 mm |

As seen from the results of Tables 1–3, the steel cords of Examples 1–9 are superior in the resistance to corrosion propagation to the steel cords of Conventional Example and Comparative Examples 1–2.

What is claimed is:

1. A steel cord for the reinforcement of rubber articles, the steel cord having a two-layer construction, which steel cord comprises a cord consisting of two steel filaments and a sheath arranged around the core and consisting of nine steel filaments, wherein a twisting pitch of the two steel filaments constituting the core is not less than 30 mm on average, and a ratio (ds/dc) of the diameter ds of each steel filament constituting the sheath to the diameter dc of each steel filament constituting the core is within a range of 35–80%, and a ratio (a/b) of the minor diameter a to the major diameter b of the cord cross-section in an arbitrary position in the longitudinal direction of the cord is within a range of 63–100%.

2. A steel cord according to claim 1, wherein the diameter dc of each steel filament constituting the core is 0.10–0.40 mm, and the diameter ds of each steel filament constituting the sheath is 0.10–0.37 mm.

3. A steel cord according to claim 1, wherein each steel filament constituting the core is a non-twisted filament.

4. A pneumatic radial tire comprising a pair of bead portions each containing a bead core embedded therein, a pair of side portions, a tread portion, a radial carcass extending between the bead portions and wound around each of the bead cores to form a turnup portion, and a belt superimposed about a crown portion of the radial carcass, in which the radial carcass and/or the belt are made from a rubberized layer of steel cords having a two-layer construction, each of the steel cords comprising a core consisting of two steel filaments and a sheath arranged around the core and consisting of nine steel filaments, wherein a twisting pitch of the two filaments constituting the core is not less than 30 mm on average, and a ratio (ds/dc) of the diameter ds of each steel filament constituting the sheath to the diameter dc of each steel filament constituting the core is within a range of 35–80%, and a ratio (a/b) of the minor diameter a to the major diameter b of the cord cross-section in an arbitrary position in the longitudinal direction of the cord is within a range of 63–100%.

5. A pneumatic radial tire according to claim 4 wherein the diameter dc of each steel filament constituting the core is 0.10–0.40 mm, and the diameter ds of each steel filament constituting the sheath is 0.10–0.37 mm.

6. A pneumatic radial tire according to claim 4, wherein each steel filament constituting the core is a non-twisted filament.

* * * * *